United States Patent
Cho

(10) Patent No.: US 7,526,952 B2
(45) Date of Patent: May 5, 2009

(54) TIRE WHEEL HAVING AIR-PRESSURE REGULATOR

(76) Inventor: Jae Won Cho, Apartment 803, 15 Rockford Road, Toronto (CA) M2R 3A3

( * ) Notice: Subject to any disclaimer, the term of this patent is extended or adjusted under 35 U.S.C. 154(b) by 74 days.

(21) Appl. No.: 11/840,163

(22) Filed: Aug. 16, 2007

(65) Prior Publication Data
US 2008/0190188 A1    Aug. 14, 2008

Related U.S. Application Data

(63) Continuation of application No. PCT/IB2006/050464, filed on Feb. 13, 2006.

(30) Foreign Application Priority Data

Feb. 16, 2005   (CA)   .................................. 2498590
Nov. 3, 2005   (CA)   .................................. 2524612

(51) Int. Cl.
*B60C 23/02*   (2006.01)

(52) U.S. Cl. ...................................... 73/146.2; 152/418

(58) Field of Classification Search ................ 73/146.2; 152/415, 417, 418

See application file for complete search history.

(56) References Cited

U.S. PATENT DOCUMENTS

| | | | | |
|---|---|---|---|---|
| 5,293,919 A * | 3/1994 | Olney et al. | .................. | 152/418 |
| 5,413,159 A * | 5/1995 | Olney et al. | .................. | 152/418 |
| 6,142,168 A * | 11/2000 | Sumrall | ...................... | 137/226 |
| 6,302,138 B1 * | 10/2001 | Sumrall | ...................... | 137/226 |
| 7,032,611 B1 * | 4/2006 | Sheng | ........................ | 137/225 |

* cited by examiner

*Primary Examiner*—Andre J Allen
(74) *Attorney, Agent, or Firm*—Workman Nydegger

(57) ABSTRACT

A tire wheel having an air pressure regulator capable of immediately varying the air pressure of a tire of a vehicle in accordance with external environments is disclosed. To regulate the internal air pressure of the tire, the air pressure regulator includes a vacuum chamber, an ultra-high pressure chamber, and a generator for generating electricity to drive the air pressure regulator. The air pressure regulator is actuated by a force generated when the tire is pressed by the ground during the rolling of the tire. An electronic controller collects data obtained by various sensors, and communicates with a central processing unit in a wireless manner. The central processing unit processes the collected data. The driver can monitor all tire states, and can set a control mode associated with the air pressure of the tire. It is possible to deflate the tire in a moment in accordance with the vacuum pressure of the vacuum chamber. The tire can also be inflated in a moment in accordance with an injection of high-pressure air from the high-pressure air chamber. Accordingly, there is no inconvenience caused by a manual regulation for the air pressure of the tire. Also, it is possible to effectively cope with a sudden situation.

14 Claims, 2 Drawing Sheets

[Fig. 1]
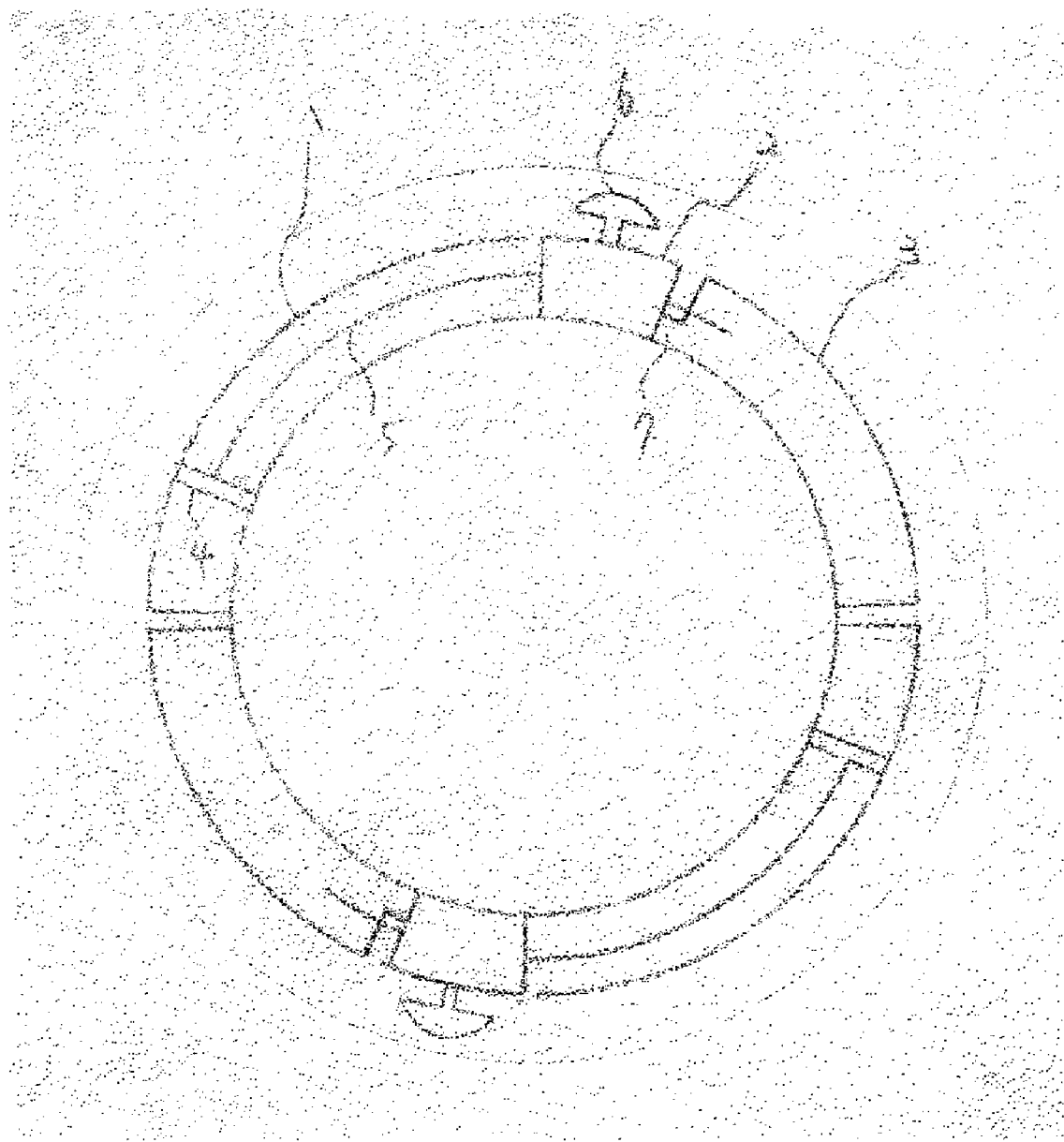

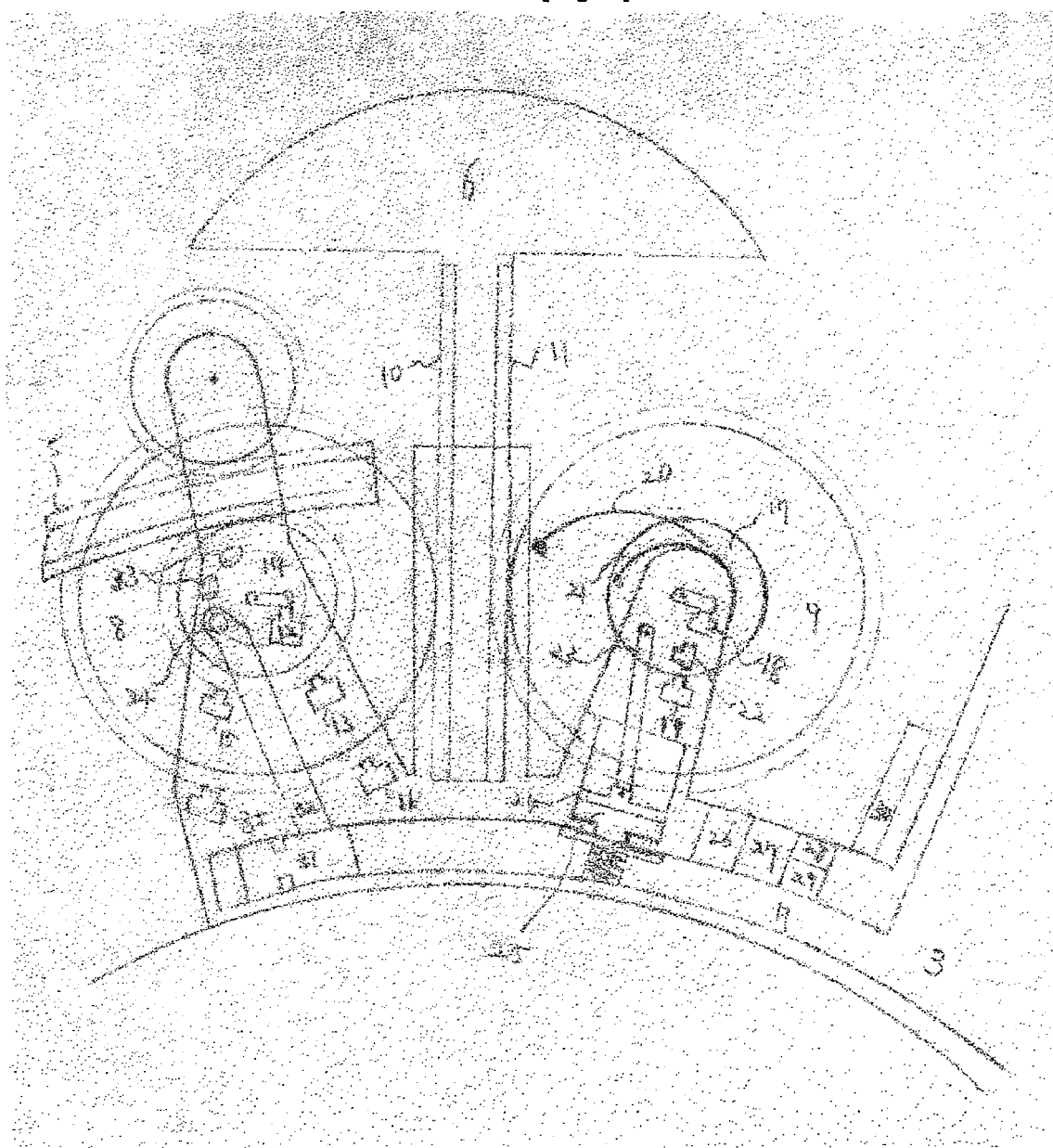
[Fig. 2]

TIRE WHEEL HAVING AIR-PRESSURE REGULATOR

CROSS-REFERENCE TO RELATED APPLICATIONS

This application is a continuation application of prior International Application No. PCT/IB2006/050464, filed Feb. 13, 2006, entitled "TIRE WHEEL CAPABLE OF TWO PHASES OF AIR PRESSURE", which claims priority to Canadian Patent Application No. 2,498,590, filed Feb. 16, 2005, entitled "TIRE WHEEL CAPABLE OF TWO PHASES OF AIR PRESSURE", and Canadian Patent Application No. 2,524,612, filed Nov. 3, 2005, entitled "TIRE WHEEL CAPABLE OF TWO PHASES OF AIR PRESSURE", the contents of which are incorporated herein in their entirety.

TECHNICAL FIELD

The present invention relates to a tire wheel having an air pressure regulator capable of regulating the air pressure of a tire mounted to a vehicle, and more particularly, to a tire wheel having an air pressure regulator capable of automatically regulating the air pressure of a tire in accordance with an external environment during running of a vehicle.

BACKGROUND ART

Generally, tires made of a rubber material are mounted to a vehicle. The tires are inflated to effectively absorb impact or the like generated during the running of the vehicle, and thus to achieve an improvement in ride quality.

The air pressure of a tire mounted to a vehicle may vary depending on ambient temperature. The tire air pressure may also vary due to leakage of air from the tire. For example, when ambient temperature is high, the air in the tire expands, thereby causing the air pressure of the tire to increase. On the other hand, when ambient temperature is low, the air in the tire shrinks, thereby causing the air pressure of the tire to decrease.

Since the air pressure of the tire varies depending on an external environment, the driver inflates or deflates the tire, to maintain the tire at a desired air pressure in spite of a variation in external environment, and thus to enable the vehicle to run in an optimal running state.

However, the air pressure of the tire desired by the driver is not always optimal in all external environments.

For example, when the air pressure of the tire is low, a degradation in fuel economy occurs, but the braking distance upon an abrupt braking operation of a brake is shortened. On the other hand, when the air pressure of the tire is high, an enhancement in fuel economy is achieved, but the braking distance upon the abrupt braking operation is lengthened.

For this reason, typically, the air pressure of the tire is set to satisfy certain performances under various conditions, rather than to satisfy a maximum performance required for only one of the conditions. For example, the air pressure of the tire is set to be within a range satisfying certain performances as to fuel economy and braking distance.

The driver drives a vehicle, to which the tire having the air pressure set in the above-mentioned manner is mounted.

However, the tire air pressure set to a fixed level, as mentioned above, is not always advantageous for the user.

For example, when the running speed of the vehicle is very high, the tire may be damaged by heat generated and accumulated due to flattening of the tire. In severe cases, the tire may puncture. In order to avoid such phenomena, it is necessary to increase the air pressure of the tire in proportion to the load and running speed of the vehicle.

On the other hand, when the air pressure of the tire is low, the braking distance is short. However, when the air pressure of the tire is low under the condition in which the vehicle runs on a wet road, a hydroplaning phenomenon may occur. In this case, the braking distance rather increases.

Therefore, it is frequently required to appropriately vary the air pressure of the tire in accordance with external environments (the load of the vehicle, the road surface state, and weather). However, to vary the air pressure of the tire before driving the vehicle, based on a prediction of external environments, is only the measure taken by the driver to cope with the external environments. Otherwise, the driver should replace the tire with a specific tire capable of exhibiting an optimal function for external environments, such as an anti-slip tire or a snow tire.

However, it is impossible to immediately vary the air pressure of the tire in accordance with external environments such as the load of the vehicle, weather, and road surface state because such external environments vary from hour to hour.

SUMMARY OF THE INVENTION

The present invention has been made in view of the above-mentioned problems, and it is an object of the present invention is to provide a tire wheel having an air pressure regulator capable of immediately varying the air pressure of a tire of a vehicle in accordance with external environments, thereby providing optimal driving conditions for the driver.

Another object of the present invention is to provide a tire wheel having an air pressure regulator capable of automatically regulating an optimal air pressure of a tire in accordance with external environments, thereby eliminating a requirement for the driver to vary the air pressure of the tire.

The objects of the present invention can be achieved by providing a tire wheel comprising: at least one air pressure regulator arranged between a wheel of a vehicle and a tire, to automatically regulate an internal air pressure of the tire in accordance with external environments including a load of the vehicle, a weather, a road state.

The at least one air pressure regulator may comprise a plurality of air pressure regulators symmetrically mounted in the tire.

The air pressure regulator may comprise a cylinder extending along an outer peripheral surface of the wheel while communicating with an interior of the tire, an ultra-high pressure chamber storing ultra-high pressure air required to rapidly increase the air pressure of the tire, and an actuator for actuating the cylinder and elements of the ultra-high pressure chamber.

The air pressure regulator may further comprise a piston arranged in the cylinder such that the piston is in contact with an inner peripheral surface of the cylinder, to push air, present in a space defined between the cylinder and one side of the piston, into the interior of the tire, while forming a vacuum in a space defined between the cylinder and the other side of the piston, and a rack gear connected to the piston, the rack gear moving in accordance with an operation of the actuator.

The actuator may comprises a reciprocating bar, a first rotating gear, which rotates in accordance with a reciprocation of the bar, and a second rotating gear, which rotates in accordance with the reciprocation of the bar.

The first rotating gear may comprise a first outer gear engaged with the bar, and a first inner gear engaged with the rack gear. The air pressure regulator may further comprise an electronic latch for controlling an engagement between the first outer gear and the first inner gear.

The air pressure regulator may further comprise an electronic stopper for preventing the inner gear from rotating in one direction when the bar reciprocates. The air pressure regulator may further comprise vanes formed at the inner gear, and a nozzle for injecting the ultra-high pressure stored in the ultra-high pressure chamber onto the vanes.

The second rotating gear may comprise a second outer gear engaged with the bar, and a second inner gear for actuating a pump for introducing the air discharged from the high-pressure chamber into the high-pressure chamber.

The air pressure regulator may further comprise first and second plate springs for applying a resilience to the second outer gear and the second inner gear, respectively, such that the second outer gear and the second inner gear return to respective original positions after rotating in one direction.

The pump may comprise a pump cylinder defining a space for sucking and compressing air, a piston, which reciprocates in the pump cylinder, and compresses air present in the pump cylinder, a connecting rod connecting the second inner gear and the piston, and a valve device arranged at one end of the pump cylinder, to control suction and discharge of air.

The air pressure regulator may further comprise a displacement sensor for measuring a displacement of the bar, a first pressure sensor for measuring the internal air pressure of the tire, a second pressure sensor for measuring the internal pressure of the ultra-high pressure chamber, and a centrifugal force sensor for measuring a centrifugal force generated at the tire. The air pressure regulator may further comprise an electronic controller, which collects data obtained by the sensors, and communicates with a central processing unit mounted to the vehicle.

DESCRIPTION OF DRAWINGS

The accompanying drawings, which are included to provide a further understanding of the invention, illustrate embodiments of the invention and together with the description serve to explain the principle of the invention.

In the drawings:

FIG. 1 is a sectional view illustrating the overall configuration of a tire wheel having an air pressure regulator according to an exemplary embodiment of the present invention.

FIG. 2 is an enlarged view illustrating an actuator included in the air pressure regulator shown in FIG. 1.

DETAILED DESCRIPTION OF THE INVENTION

Reference will now be made in detail to the preferred embodiments of the present invention associated with an air pressure regulator, examples of which are illustrated in the accompanying drawings.

Referring to FIG. 1, an air pressure regulator 10 according to an exemplary embodiment of the present invention is illustrated. The air pressure regulator 10 is arranged between a wheel 1 of a vehicle and a tire 2 fitted around the wheel 1, to automatically regulate the air pressure of the tire 2. Preferably, a plurality of air pressure regulators 10 are arranged between the wheel 1 and the tire 2. In this case, it is preferred that the air pressure regulators 10 be symmetrically arranged.

As shown in FIG. 1, the air pressure regulator 10 mainly includes a cylinder 100 extending along an outer peripheral surface of the wheel 1 while communicating with the interior of the tire 2, an ultra-high pressure chamber 300 storing ultra-high pressure air to cope with the case in which it is necessary to rapidly increase the air pressure of the tire 2, and an actuator 200 for actuating the cylinder 100 and various elements of the ultra-high pressure chamber 300.

The interior of the cylinder 100 communicates with the interior of the tire 2 via a connecting passage 101. A piston 120 is arranged in the cylinder 100. The piston 120 is connected to the actuator 200 by a rack gear 110 having the same curvature of radius as the cylinder 100. The piston 120 functions to push air, present in a space defined between the cylinder and one side of the piston 120, into the interior of the tire 2 via the connecting passage 101, while forming a vacuum in a space defined between the cylinder and the other side of the piston 120. The piston 120 is in close contact with the inner peripheral surface of the cylinder 100. Accordingly, when the piston 120 moves in the cylinder 100, the internal pressure of the cylinder 100 varies. The pressure variation of the cylinder 100 causes a variation in the air pressure of the tire 2 communicating with the cylinder 100.

When the piston 120 moves in a clockwise direction (right direction) in FIG. 1, air present in the cylinder 100 is introduced into the tire 2 via the connecting passage 101, so that the air pressure of the tire 2 increases. On the other hand, when the piston 120 moves in a counter-clockwise direction (left direction) in FIG. 1, air present in the tire 2 is discharged into the cylinder 100, so that the air pressure of the tire 2 decreases in a moment.

Hereinafter, the actuator 200 briefly described above and a configuration associated therewith will be described in detail with reference to FIG. 2.

As shown in FIG. 2, the actuator 200 includes a bar 210 arranged to linearly move in a radial direction when the tire 2 rolls, a first rotating gear 220, which rotates in accordance with the linear movement of the bar 210, to move the rack gear 110 connected to the piston 120, and a second rotating gear 250, which rotates in accordance with the linear movement of the bar 210, to actuate a pump such that air discharged from the ultra-high pressure chamber 300 is again introduced into the ultra-high pressure chamber 300. The pump will be described later.

The bar 210 includes a head 211 having a convex surface coming into contact with the inner surface of the tire 2 when the tire 2 rolls, and a rod 212 extending from the head 211 and having rack gears 212a and 212b respectively formed at opposite sides of the rod 212 and engaged with the first and second rotating gears 220 and 250.

The first rotating gear 220 includes a first outer gear 230 engaged with the bar 210, and a first inner gear 240 arranged inside the first outer gear 230, and engaged with the rack gear 110.

An electronic latch 221 is arranged between the first outer gear 230 and first inner gear 240 of the first rotating gear 220, to control the engagement between the first outer gear 230 and the first inner gear 240 such that, when the first outer gear 230 rotates, the first inner gear 240 rotates together with the first outer gear 230, or does not rotate. The electronic latch 221 causes the first outer gear 230 and first inner gear 240 to engage with each other when the bar 210 moves toward the center of the wheel 1, while preventing the first outer gear 230 and first inner gear 240 from engaging with each other when the bar 210 moves away from the center of the wheel 1.

Accordingly, when the first outer gear 230 rotates in the counter-clockwise direction in accordance with the movement of the bar 210 toward the center of the wheel 1, the first outer gear 230 engages with the first inner gear 240, thereby causing the first inner gear 240 to rotate. However, when the first outer gear 230 rotates in the clockwise direction in accordance with the movement of the bar 210 away from the center of the wheel 1, the first outer gear 230 does not engage with the first inner gear 240. In this case, accordingly, the first inner gear 240 does not rotate.

An electronic stopper 222 is also provided to prevent the first inner gear 240 from rotating in the counter-clockwise direction when the bar 210 moves upwardly after moving downwardly to cause the first inner gear 240 to rotate together with the first outer gear 230 engaging with the first inner gear 240.

Thus, when the bar 210 reciprocates upwardly and downwardly under the condition in which first outer gear 230 and first inner gear 240 selectively engage with each other, the first inner gear 240 rotates little by little in the clockwise direction. In accordance with the clockwise rotation of the first inner gear 240, the rack gear 110, which engages with the first inner gear 240, also moves in the clockwise direction. As a result, the piston 120 connected to the rack gear 110 moves right to push air present in the space defined between the cylinder and one side of the piston 120, while forming a vacuum in the space defined between the cylinder and the other side of the piston 120. The air pushed by the piston 120 is introduced into the interior of the tire 2, thereby increasing the air pressure of the tire 2.

A counting sensor 223 is installed on the first rotating gear 220. The counting sensor 223 counts the number of the teeth of the rack gear 110 shifted during the movement of the rack gear 110, to identify the position of the piston 120.

Meanwhile, when the electronic stopper 222 releases the first inner gear 240, the first inner gear 240 rotates in the counter-clockwise direction, thereby causing the piston 120 to return to an original position thereof. As the piston 120 returns to the original position, the air pressure of the tire 2 decreases to an initial level in a moment.

The second rotating gear 250 includes a second outer gear 260 engaged with the bar 210, and a second inner gear 270 arranged inside the second outer gear 260, to actuate the pump 280.

The second outer gear 260 engages with the rack gear 212b formed on the bar 210 such that the second outer gear 260 rotates in the counter-clockwise direction when the bar 210 moves downwardly, while rotating in the clockwise direction when the bar 210 moves upwardly.

In the second rotating gear 250, an electronic latch 251 is also arranged between the second outer gear 260 and second inner gear 270, to control the engagement between the second outer gear 260 and the second inner gear 270 such that, when the second outer gear 260 rotates, the second inner gear 270 rotates together with the second outer gear 260, or does not rotate.

That is, when the second outer gear 260 and second inner gear 270 engage with each other by the electronic latch 251, the second inner gear 270 rotates together with the second outer gear 260 during the rotation of the second outer gear 260. However, when the second outer gear 660 and second inner gear 270 do not engage with each other, the second inner gear 270 does not rotate in spite of the rotation of the second outer gear 260.

An electronic stopper 252 is also provided to prevent the second inner gear 270 from rotating in the clockwise direction when the bar 210 moves upwardly after moving downwardly to cause the second inner gear 270 to rotate together with the second outer gear 260 engaging with the second inner gear 270.

First and second plate springs 253 and 254 are also provided to return, to respective original positions thereof, the second outer gear 260 and second inner gear 270, rotated in the counter-clockwise direction by the bar 210 moved downwardly.

The first plate spring 253 is connected to the second outer gear 260, whereas the second plate spring 254 is connected to the second inner gear 270. Accordingly, when the bar 210 moves downwardly, the second outer gear 260 and second inner gear 270 rotate in the counter-clockwise direction, thereby compressing the first and second plate springs 253 and 254, respectively.

When the bar 210 is spaced away from the inner surface of the tire 2 in the compressed state of the first plate spring 253, the second outer gear 260 rotates in the clockwise direction by the resilience of the first plate spring 253. At this time, the bar 210 engaged with the second outer gear 260 moves away from the center of the wheel 1. When the second inner gear 270 rotates though a certain angle in the counter-clockwise direction, the electronic stopper 252 releases the second inner gear 270. As a result, the second inner gear 270 rotates in the clockwise direction by the resilience of the second plate spring 254.

The second inner gear 270 actuates the pump 280 while rotating in the counter-clockwise and clockwise directions.

The pump 280 includes a pump cylinder 281 defining a space for sucking and compressing air, a piston 282, which reciprocates in the pump cylinder 281, and compresses air present in the pump cylinder 281, a connecting rod 283 connecting the second inner gear 270 and the piston 282, and a valve device 284 arranged at one end of the pump cylinder 281, to control suction and discharge of air.

The connecting rod 283 is connected to the second inner gear 270 near the outer peripheral edge of the second inner gear 270. Accordingly, when the second inner gear 270 rotates in the counter-clockwise direction, the connecting rod 283 downwardly pushes the piston 282, thereby causing air present in the pump cylinder 281 to be compressed. On the other hand, when the second inner gear 270 rotates in the clockwise direction, the connecting rod 283 upwardly pulls the piston 282, thereby causing air to be sucked into the pump cylinder 281.

Thus, when the pump 280 operates, air present outside the ultra-high pressure chamber 300 is introduced into the ultra-high pressure chamber 300. Accordingly, high-pressure air is stored in the ultra-high pressure chamber 300.

Meanwhile, a proximity sensor 255 is provided to sense a movement of the connecting rod 283 included in the pump 280. When the piston 282 reaches the bottom of the cylinder 281, the proximity sensor 255 senses this state, thereby causing the electronic latch 251 to release the second inner gear 270. In this state, accordingly, the second inner gear 270 returns to the original position thereof by the second plate spring 254.

When no pumping operation of the pump 280 is required, the electronic latch 251 operates to prevent the second inner gear 270 and second outer gear 260 from engaging with each other. In this case, accordingly, the second inner gear 270 does not rotate, so that the piston 282 does not operate.

The air pressure regulator 10 according to the present invention also includes a generator (not shown), and a battery 400 for accumulating electricity generated by the generator. The electricity accumulated in the battery 400 is used to operate various sensors. These sensors will be described later.

A stopper 290 is also provide to restrain a movement of the bar 210 when any operation is not required during the rolling of the tire 2. The stopper 290 operates to engage with the first outer gear 230. In this case, the bar 210 is maintained at a fixed position without moving away from the center of the wheel 1 even when the bar 210 is spaced away from the inner surface of the tire 2.

Meanwhile, there are devices for abruptly increasing the air pressure of the tire 2 when such an abrupt air pressure increase is required.

In the ultra-high pressure chamber 300, air compressed in accordance with the operation of the pump 280 is stored. The ultra-high pressure chamber 300 is opened to the first rotating gear 220 via a pipe 310. A nozzle 320 is mounted to an end of the pipe 310 facing the first rotating gear 220. An electronic valve 330 is installed at a connection between the pipe 310 and the nozzle 320, to control opening and closing of a passage defined in the pipe 310, and thus to control injection of air from the ultra-high pressure chamber 300 through the nozzle 320.

Vanes 235 are formed at the first inner gear 240, to cause the first inner gear 240 to rotate by the high-pressure air injected from the nozzle 320.

When a high-pressure air is injected from the nozzle 320, the vanes 235 receive the pressure of the injected air. When an additional increase in the air pressure of the tire 2 is required, simultaneously with an increase in the air pressure of the tire 2 caused by the injection of the high-pressure air, the first inner gear 240 is allowed to rotate in the clockwise direction by the pressure applied to the vanes 235. However, when it is only necessary to supply the high-pressure air, the first inner gear 240 is prevented from rotating by the pressure applied to the vanes 235.

When the first inner gear 240 rotates in the clockwise direction, the rack gear 110 engaged with the first inner gear 240 moves right. As a result, the air pressure of the tire 2 increases to a desired level in accordance with the operation of the piston 120 and the injection of the high-pressure air, which are simultaneously carried out.

In order to achieve the instantaneous air pressure increase such that the air pressure of the tire 2 corresponds to a level achieved when the piston 120 is at a position where the piston 120 escapes from the cylinder 100 by a maximum distance, and thus to enable an instantaneous air pressure decrease, which may be subsequently required, the piston 120 further pushes air present in the cylinder 100 in accordance with a reciprocation of the bar 210. At this time, air is recovered into the ultra-high pressure chamber 300, and is compressed by the pump 280.

Meanwhile, the air pressure regulator 10 according to the present invention further includes a displacement sensor 410 for measuring a displacement of the bar 210. The air pressure regulator 10 also includes a first pressure sensor 420 for measuring the air pressure of the tire 2, and a second pressure sensor 430 for measuring the internal pressure of the ultra-high pressure chamber 300. The air pressure regulator 10 further includes a centrifugal force sensor 440 for measuring a centrifugal force generated at the tire 2. Accordingly, when an abrupt variation in centrifugal force occurs at the tire 2, it is sensed by the centrifugal force sensor 440. Based on the sensed centrifugal force variation, it is possible to sense the level of the braking force or the slippage of the tire 2.

An electronic controller 450 is also provided to collect data obtained by the above-described sensors.

A central processing unit (not shown), which communicates with the electronic controller 450 in a wireless manner, is also provided. Also, an input unit (not shown) is provided to allow the driver to regulate the air pressure of the tire 2.

Thus, the driver can attain all information as to the air pressure of the tire 2, and can directly regulate the air pressure of the tire 2 to an optimal level for external environments by setting an appropriate mode through the input unit. The driver can also set an operation mode for a sudden situation.

Hereinafter, operation of the air pressure regulator will be described.

For example, in the case in which a number of passengers ride in the vehicle, the displacement sensor 410 senses a variation in the displacement of the bar 210 caused by a rotation of the tire 2. Based on the sensing results of the displacement sensor 410, it is possible to sense the fact that the load of the vehicle has increased. The centrifugal force sensor 440 also senses the rotating speed of the tire 2.

When an increase in the load of the vehicle or an increase in running speed occurs, as described above, it is advantageous to increase the air pressure of the tire 2, in order to achieve an enhancement in fuel economy.

When the electronic controller 450 controls the stopper 290 to release the bar 210, the head 211 of the bar 210 comes into contact with the inner surface of the tire 2 during the rotation of the tire 2. In this case, the bar 210 is upwardly pressed in accordance with a pressure applied from the ground to the bar 210 via the inner surface of the tire 2 when the head 211 comes into contact with the inner surface of the tire 2. As the bar 210 is upwardly pressed, it moves upwardly, thereby causing the first rotating gear 220 to rotate in the clockwise direction. As the bar 210 is spaced away from the inner surface of the tire 2 in accordance with the rotation of the tire 2, the bar 210 returns to an original position thereof. When the bar 210 subsequently comes into contact with the inner surface of the tire 2 in accordance with the rotation of the tire 2, the bar 210 is again upwardly pressed to move upwardly.

As the bar 210 repeatedly performs a linear reciprocation in the above-described manner, the piston 120 repeatedly pushes air from the cylinder 100 into the interior of tire 2, to increase the air pressure of the tire 2.

The increasing air pressure of the tire 2 is measured by the firs pressure sensor 420. When the air pressure of the tire 2 reaches an optimal level meeting the load and running speed of the vehicle, the electronic controller 450 controls the stopper 290 to engage with the first outer gear 230. Accordingly, the internal pressure of the tire 2 is maintained at the optimal level. When it is subsequently necessary to increase the air pressure of the tire 2 in a moment, based on a speed variation of the tire 2 or a slippage of the tire 2 sensed by the centrifugal force sensor 440 upon a sudden braking operation, the electronic stopper 222 releases the first inner gear 240, to return the piston 120 to the original position thereof. Accordingly, the air pressure of the tire 2 decreases in a moment, thereby increasing the ground contact area of the tire 2. Thus, an increase in braking force is achieved.

On the other hand, when the centrifugal force sensor 440 senses the fact that the driver suddenly brakes the vehicle on a wet road, it is necessary to abruptly increase the air pressure of the tire 2, in order to prevent occurrence of a hydroplaning phenomenon.

When it is required to abruptly increase the air pressure of the tire 2, the electronic controller 450 controls the electronic valve 330 to be opened, thereby causing the high-pressure air in the ultra-high pressure chamber 300 to be injected through the nozzle 320.

When it is necessary to further increase the air pressure of the tire 2 in accordance with an operation of the piston 120 to a level achieved when the piston 120 is at a position where the piston 120 escapes from the cylinder 100 by a maximum distance, and thus to enable an instantaneous air pressure decrease, which may be subsequently required, the high-pressure air injected through the nozzle 320 applies a pressure to the vanes 235 formed at the first inner gear 240, to rotate the first inner gear 240 in the clockwise direction. The rack gear 110 is pulled in accordance with the rotation of the first inner gear 240. As a result, the air pressure of the tire 2 increases rapidly.

Accordingly, the ground contact area of the tire 2 decreases, so that it is possible to prevent occurrence of a hydroplaning phenomenon.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Thus, the air pressure regulator can regulate the air pressure of the tire 2 in various modes, taking into consideration the fuel economy, the state of the road surface, weather, etc.

The invention claimed is:

1. A tire wheel comprising:
   at least one air pressure regulator arranged between a wheel of a vehicle and a tire, to automatically regulate an internal air pressure of the tire in accordance with external environments including a load of the vehicle, a weather, a road state.

2. The tire wheel according to claim 1, wherein the at least one air pressure regulator comprises a plurality of air pressure regulators symmetrically mounted in the tire.

3. The tire wheel according to claim 1, wherein the air pressure regulator comprises:
   a cylinder extending along an outer peripheral surface of the wheel while communicating with an interior of the tire;
   an ultra-high pressure chamber storing ultra-high pressure air required to rapidly increase the air pressure of the tire; and
   an actuator for actuating the cylinder and elements of the ultra-high pressure chamber.

4. The tire wheel according to claim 3, wherein the air pressure regulator further comprises:
   a piston arranged in the cylinder such that the piston is in contact with an inner peripheral surface of the cylinder, to vary an internal air pressure of the cylinder; and
   a rack gear connected to the piston, the rack gear moving in accordance with an operation of the actuator.

5. The tire wheel according to claim 4, wherein the actuator comprises:
   a reciprocating bar;
   a first rotating gear, which rotates in accordance with a reciprocation of the bar; and
   a second rotating gear, which rotates in accordance with the reciprocation of the bar.

6. The tire wheel according to claim 5, wherein the first rotating gear comprises:
   an outer gear engaged with the bar; and
   an inner gear engaged with the rack gear.

7. The tire wheel according to claim 6, wherein the air pressure regulator further comprises:
   an electronic latch for controlling an engagement between the outer gear and the inner gear.

8. The tire wheel according to claim 6, wherein the air pressure regulator further comprises:
   an electronic stopper for preventing the inner gear from rotating in one direction when the bar reciprocates.

9. The tire wheel according to claim 6, wherein the air pressure regulator further comprises:
   vanes formed at the inner gear; and
   a nozzle for injecting the ultra-high pressure stored in the ultra-high pressure chamber onto the vanes.

10. The tire wheel according to claim 5, wherein the second rotating gear comprises:
    an outer gear engaged with the bar; and
    an inner gear for actuating a pump for introducing the air discharged from the high-pressure chamber into the high-pressure chamber.

11. The tire wheel according to claim 10, wherein the air pressure regulator further comprises:
    first and second plate springs for applying a resilience to the outer gear and the inner gear, respectively, such that the outer gear and the inner gear return to respective original positions after rotating in one direction.

12. The tire wheel according to claim 10, wherein the pump comprises:
    a pump cylinder defining a space for sucking and compressing air;
    a piston, which reciprocates in the pump cylinder, and compresses air present in the pump cylinder;
    a connecting rod connecting the inner gear and the piston; and
    a valve device arranged at one end of the pump cylinder, to control suction and discharge of air.

13. The tire wheel according to claim 3, wherein the air pressure regulator further comprises:
    a displacement sensor for measuring a displacement of the bar;
    a first pressure sensor for measuring the internal air pressure of the tire;
    a second pressure sensor for measuring the internal pressure of the ultra-high pressure chamber; and
    a centrifugal force sensor for measuring a centrifugal force generated at the tire.

14. The tire wheel according to claim 13, wherein the air pressure regulator further comprises: an electronic controller, which collects data obtained by the sensors, and communicates with a central processing unit mounted to the vehicle.

* * * * *